(12) United States Patent
Lukaszewski et al.

(10) Patent No.: US 10,827,433 B2
(45) Date of Patent: Nov. 3, 2020

(54) MANAGING POWER CONSUMPTION OF A NETWORK

(71) Applicant: HEWLETT PACKARD ENTERPRISE DEVELOPMENT LP, Houston, TX (US)

(72) Inventors: Charles Lukaszewski, Santa Clara, CA (US); Sachin Ganu, San Jose, CA (US); Shahnawaz Siraj, San Jose, CA (US); Eldad Perahia, Portland, OR (US); Andre Beaudin, Montreal (CA); Qiang Zhou, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/720,293

(22) Filed: Sep. 29, 2017

(65) Prior Publication Data

US 2019/0104475 A1    Apr. 4, 2019

(51) Int. Cl.
*H04W 52/02* (2009.01)
*H04L 12/24* (2006.01)

(52) U.S. Cl.
CPC ... *H04W 52/0254* (2013.01); *H04W 52/0206* (2013.01); *H04W 52/0222* (2013.01); *H04L 41/0206* (2013.01); *H04L 41/0246* (2013.01)

(58) Field of Classification Search
CPC .......... H04W 52/0254; H04W 52/0222; H04L 41/0206; H04L 41/0246
See application file for complete search history.

(56) References Cited

U.S. PATENT DOCUMENTS

| | | |
|---|---|---|
| 7,884,727 B2 | 2/2011 | Tran |
| 8,600,556 B2 | 12/2013 | Nesler et al. |
| 8,806,250 B2 * | 8/2014 | Gatta .................... G06F 1/3209 713/323 |
| 9,615,371 B1 * | 4/2017 | de Barros Chapiewski ................ H04W 4/023 |

(Continued)

FOREIGN PATENT DOCUMENTS

KR    20150078799    7/2015

OTHER PUBLICATIONS

European Search Report and Search Opinion Received for EP Application No. 17199017.9, dated May 28, 2018, 6 pages.

(Continued)

*Primary Examiner* — Luat Phung
(74) *Attorney, Agent, or Firm* — Hewlett Packard Enterprise Patent Department

(57) ABSTRACT

Examples provided herein describe a method for managing power consumption of a network. For example, a network device may monitor a set of network area zones of a network coverage area, where each network area zone is associated with a set of edge devices. A first occupancy state may be determined for a first network area zone of the set of network area zones based on usage of a first set of edge devices of the first network area zone. Based on the determined first occupancy state, a first power consumption policy for the first network area zone may be determined. Responsive to determining the first power consumption policy, the determined first power consumption policy may be applied to the first set of edge devices in the first network area zone at least edge changing a power consumption mode of a first edge device in the first set of edge devices.

17 Claims, 3 Drawing Sheets

(56) References Cited

U.S. PATENT DOCUMENTS

| | | |
|---|---|---|
| 9,620,959 B2 | 4/2017 | Sen et al. |
| 2010/0270933 A1 | 10/2010 | Chemel et al. |
| 2013/0157677 A1 | 6/2013 | Liao et al. |
| 2014/0047260 A1* | 2/2014 | Iijima .................... G06F 1/3287 713/324 |
| 2014/0050097 A1 | 2/2014 | Zhang et al. |
| 2015/0088272 A1 | 3/2015 | Drew |
| 2015/0362983 A1* | 12/2015 | Frick ..................... G06F 1/3221 713/324 |
| 2015/0382290 A1 | 12/2015 | Yaacoub |

OTHER PUBLICATIONS

Lu, J. et al.; The Smart Thermostat: Using Occupancy Sensors to Save Energy in Homes; 2010; 14 pages.

\* cited by examiner

MANAGING POWER CONSUMPTION OF A NETWORK

BACKGROUND

Usage of a network is variable, based on factors that may or may not be outside of the control of the network. This variable usage results in potentially erratic and unpredictable amounts of power consumption by the network and its devices and interferences with business objectives to reduce energy consumption and expense due to factors such as statutory requirements, cost reduction initiatives, carbon footprints, and so forth. As such, managing power consumption of a network and its associated devices may be difficult.

BRIEF DESCRIPTION OF THE DRAWINGS

The following detailed description references the drawings, wherein.

DETAILED DESCRIPTION

Figure 1:
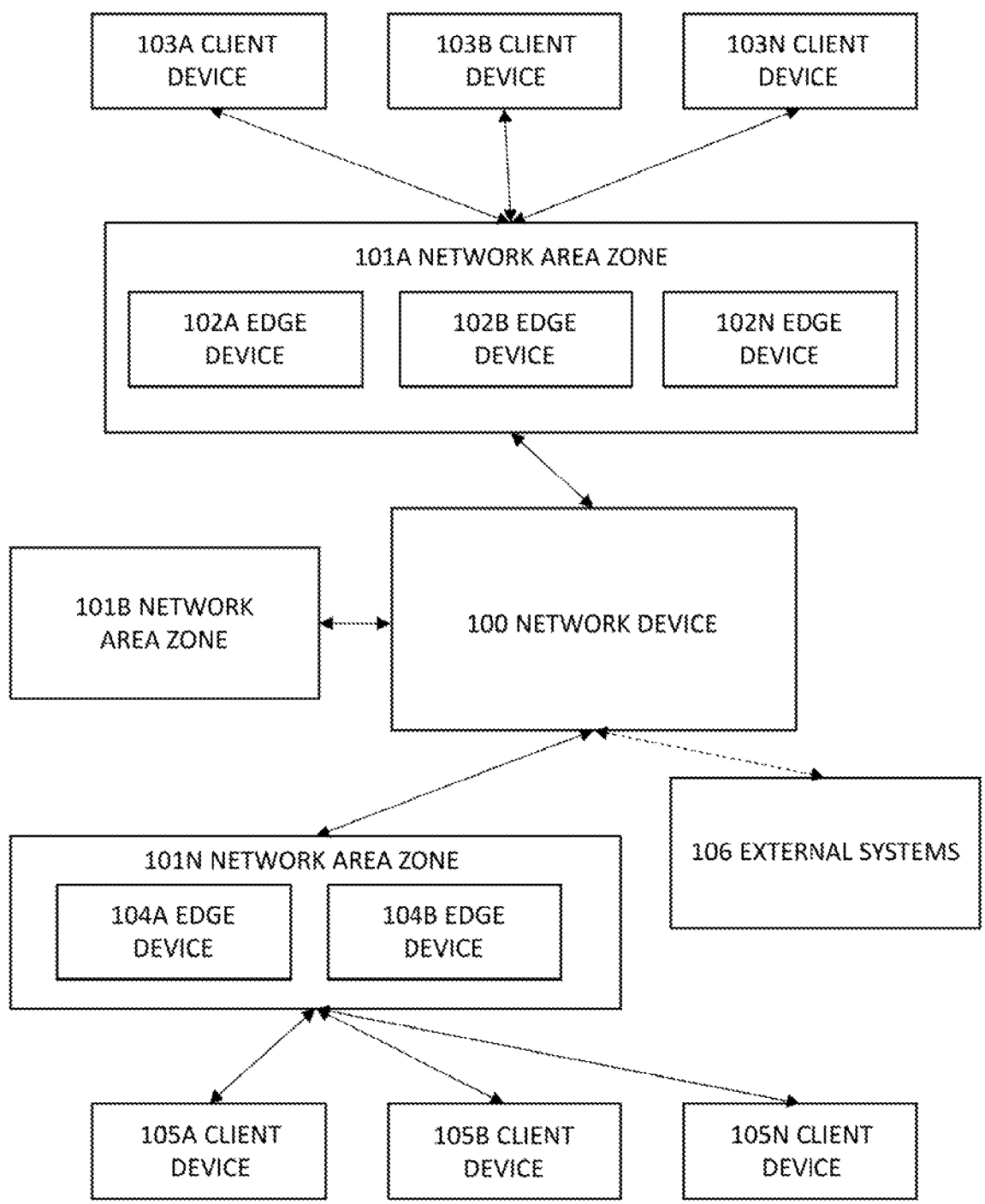
FIG. 1 is a block diagram depicting an example environment in which various examples may be implemented as a system that facilitates managing power consumption of a network.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for managing power consumption of a network. The disclosed examples may include systems, devices, computer-readable storage media, and methods for managing power consumption of a network. For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

Usage of a network is variable, based on factors that may or may not be outside of the control of the network. This variable usage results in potentially erratic and unpredictable amounts of power consumption by the network and its devices and interferences with business objectives to reduce energy consumption and expense due to factors such as statutory requirements, cost reduction initiatives, carbon footprints, and so forth. As such, managing power consumption of a network and its associated devices may be difficult.

A technical solution to this technical challenges would use knowledge of the presence and absence of data consumption in a network coverage area served by a network to dynamically enable, disable, or reduce functionality in the network and thus manage power consumption in the network. The technical solution may use knowledge of the presence or absence of data consumption in a network coverage area to determine how to manage devices in the network. The technical solution may affect power state and/or functionality of devices in the network to manage power consumption in the network. The technical solution may also interface and interconnect with external grid management systems used by electric power utilities to affect power consumption of electric devices collocated with the network. The technical solution may also sense and control power consumption of externally connected systems like the HVAC, printers, televisions, lighting management, and/or other external systems.

Examples discussed herein address these technical challenges and manage power consumption of a network by monitoring a set of network area zones of a network coverage area, where each network area zone may include a set of edge devices. The technical solution may then determine, for a first network area zone of the set of network area zones, a first occupancy state based on usage of a first set of edge devices of the first network area zone. Based on the determined first occupancy state, the technical solution may determine a first power consumption policy for the first network area zone. Responsive to determining the first power consumption policy, the technical solution may automatically apply the determined first power consumption policy to the first set of edge devices in the first network area zone by changing a power consumption mode of a first edge device in the first set of edge devices and/or an associated set of client devices.

FIG. 1 is an example environment in which various examples may be implemented as a system that facilitates managing power consumption of a network. The network may comprise a wireless network, a wired network, a mix of wired and wireless networks, a mix of wireless technologies (e.g., from more than one type of radio), and/or other type or mix of networks.

In some examples, the environment of FIG. 1 may represent a network coverage area in which the components reside. The network coverage area represented in FIG. 1 may comprise, for example, a neighborhood, city block, street, campus, parks, airports, transportation stations, building, building floor(s), and/or other area in which a network provides coverage.

In some examples, the system of FIG. 1 that facilitates managing power consumption of a network may include various components such as a network device 100, a set of network area zones (e.g., zones 101A, 101B, . . . , 101N), where each network area zone comprises a set of edge devices (e.g., edge devices 102A, 102B, . . . , 102N, 104A, . . . , 104N), sets of client devices connected to the sets of edge devices (e.g., client devices 103A, 103B, . . . 103N, 105A, 105B, . . . , 105N), and/or other devices communicably coupled to the network device 100. The network device 100 may communicate to and/or receive data from the other devices and/or other components in the system.

The network device (e.g., network device 100) may comprise an access point, network switch, cloud server, or other hardware device on a network. The network device may comprise a physical processor (e.g., physical processor 110) that implements machine readable instructions to facilitate communication and perform functionality in the network. Physical processor 110 may be at least one central processing unit (CPU), microprocessor, and/or other hardware device suitable for performing the functionality described in relation to FIG. 2.

The network device (e.g., network device 100) may communicate with a set of network area zones, edge devices, client devices, and/or other devices on the network.

A network area zone (e.g., network area zone 101A) may comprise a set of associated edge devices (e.g., 102A, 102B, . . . , 102N). An edge device (e.g., edge device 101N) may comprise an access point, network switch, or other hardware device on a network that may be connected to both the network device (e.g., network device 100) and a client device (e.g., devices 103A, 103B, . . . , 103N). While not each network area zone (e.g., zone 102B) may be depicted in the Figures as being connected to a set of associated edge devices, each network area zone may be associated with a corresponding set of associated edge devices.

In some examples, the network device (e.g., network device 100) may determine which edge devices may be associated with a network area zone. In other examples, the associations may be pre-determined, provided by a network administrator, stored on a non-transitory machine-readable storage medium communicably coupled to the network device, and/or otherwise made available. For example, each zone could have a set of associated edge devices based on usage of the devices (e.g., devices used in a public area like a cafeteria versus a private work area, conference room, utility space, etc.), deployment of the edge devices, functionalities available via the edge devices, time and day of normal operation of the edge devices, collocation, and/or other factors. In some examples, each edge device in the network may be associated with a zone. In these examples, there each edge device may be associated with only one zone, but each zone may be associated with one or multiple edge devices.

Each zone may also have a set of ingresses/egresses. For example, one or multiple edge devices in each zone may be marked as an ingress/egress point for the network area zone. In some examples, an ingress/egress point may comprise a physical entrance to a physical structure, a physical or virtual boundary between two adjacent areas, and/or other type of ingress/egress.

Client devices 103A, 103B, . . . , 103N, 105A, 105B, . . . , 105N may be any devices that are communicably coupled to the edge device. These devices may be communicably coupled to an edge device as they move within a service area of the edge device, or may be stationary and permanently communicably coupled to the edge device. Examples of client devices include mobile phones, printers, cameras, thermostats, IoT devices, traffic signals, lightbulbs, sensors, and/or any other device that communicates via a wired or wireless connection with an edge device on a network.

The network device (e.g., network device 100) may manage the network area zones (e.g., zones 101A, 101B, . . . , 101N). For example, for each network area zone (e.g., zones 101A, 101B, . . . , 101N), the network device (e.g., network device 100) may have access to information about each of the set of edge devices (e.g., edge devices 102A, 102B, . . . , 102N, 104A, 104B) associated with the network area zone and may be able to change functionality, settings, channel, bandwidth, power level, and/or other characteristics of each of the edge devices and/or the client devices.

For each network area zone (e.g., zones 101A, 101B, . . . , 101N), the network device (e.g., network device 100) may use information about presence, absence, and data consumption of client devices connected to edge devices in the network area zone to determine an occupancy state of the network area zone. For example, for each network area zone in the network coverage area, the network device (e.g., network device 100) may determine whether a change in occupancy has occurred. The network device (e.g., network device 100) may determine whether a change in occupancy has occurred by determining whether a metric related to usage of the edge devices in the network area zone has changed more than a predetermined threshold related to that metric in a predetermined time interval. A metric may include one or multiple of a number of edge devices that are active in the network area zone, a number of channels used by the edge devices in the network area zone, and amount of bandwidth being transferred by edge devices in the network area zone, and/or any other appropriate measure of occupancy of the network area zone. The network device (e.g., network device 100) may have an associated indicator of occupancy (e.g., empty, light, medium, heavy, and/or other indicator) based on the determined occupancy.

For example, the network device (e.g., network device 100) may consider an amount of edge devices in the network area zone and the activity of the edge devices to determine occupancy. In this example, the network device (e.g., network device 100) may determine that a network area zone has an occupancy with an associated indicator of empty responsive to determining that no devices are in the network area zone for the predetermined time interval. The network device (e.g., network device 100) may determine that a network area zone has an occupancy with an associated indicator of light responsive to determining that an amount of devices less than a first threshold are in the network area zone and are active for the predetermined time interval. The network device (e.g., network device 100) may determine that a network area zone has an occupancy with an associated indicator of medium responsive to determining that an amount of devices past a first threshold are in the network area zone and a first amount of devices greater than an associated threshold are active for the predetermined time interval. The network device (e.g., network device 100) may determine that a network area zone has an occupancy with an associated indicator of heavy responsive to determining that an amount of devices past a second threshold are in the network area zone and an amount of devices greater past a second associated threshold are active for the predetermined time interval. In this example, the network device (e.g., network device 100) may determine that an edge device is active responsive to determining that the edge device is transmitting data, is in an active power state, and/or based on other factors that indicate the edge device is active. The network device (e.g., network device 100) may determine an occupancy of the network using other metric(s) as well and is not limited to the examples described herein.

The network device (e.g., network device 100) may determine the metric or set of metrics associated with a network area zone and a corresponding threshold or set of thresholds from a machine-readable storage medium communicably coupled to the network zone, and/or by another manner. In some examples, the metric or set of metrics associated with a zone may also be determined based on a time at which the occupancy of the network area zone is determined, a previously determined occupancy of the network area zone, a power consumption policy associated with the network area zone, and/or based on other factors. In other examples, a single metric or set of metrics may be used for each network area zone. Other manners of determining occupancy may be used as well.

The network device (e.g., network device 100) may determine a power consumption policy for a network area zone based on the determined occupancy for the network area zone. A power consumption policy may comprise, for example, an identifier of the power consumption policy, an association to an occupancy and/or to an occupancy and a previous power consumption policy, information about how to apply the power consumption policy, and/or other information related to the power consumption policy. The information about how to apply the power consumption policy may comprise, for example, In some examples, the network device (e.g., network device 100) may determine an association between a determined occupancy and a power consumption policy from a machine-readable storage medium communicably coupled to the network device. In some examples, there may be a one-to-one or one-to-many association between a power consumption policy and a determined occupancy. In some examples, the association may comprise an association between a power consumption policy, the determined occupancy, and the existing or previous power consumption policy for the network area zone. In these examples, the network device (e.g., network device 100) may determine the power consumption policy based on the previous power consumption policy and determined occupancy.

Responsive to determining the power consumption policy for the network area zone, the network device (e.g., network device 100 may apply the determined power consumption policy to the network area zone. The network device (e.g., network device 100) may apply the power consumption policy in various manners. For example, the network device (e.g., network device 100) may apply the power consumption policy based on information associated or in the power consumption policy. In this example, the power consumption policy may have information that indicates how the power consumption policy is to be applied to a network area zone (e.g., a power consumption mode for the edge devices in the network area zone or a set of power consumption modes for edge devices in the network area zone based on factors associated with the edge devices in the network area zones.

In some examples, the network device (e.g., network device 100) may apply the power consumption policy by determining, for each edge device in a set of edge devices in the network area zone, a corresponding power consumption mode, and causing each edge device in the set of edge devices to enter that corresponding determined power consumption mode. The network device (e.g., network device 100) may determine, for each edge device, the corresponding power consumption mode based on a set of functionalities of the edge device, based on a proximity of the edge device to an ingress/egress of the network area zone, and/or in other manners. The network device (e.g., network device 100) may cause each edge device to enter the corresponding determined power consumption mode by, for example, reducing the set of functionalities available via the edge device, causing the edge device to enter a low power state, and/or otherwise causing the edge device to enter the corresponding determined power consumption mode. A low power state may comprise powering the device off, setting the device in a power mode to be woken by a signal (e.g., Wake on LAN or Wake on WLAN signal), and/or another type of low power state. In some examples, the power consumption policy may have different power consumption modes for different subsets of edge devices in the network area zone based on a location, functionality, ingress/egress capability, and/or other factor of the edge device.

In other examples, the network device (e.g., network device 100) may apply the power consumption policy by providing, to each edge device in the set of edge devices, information about the determined first power consumption policy. Each edge device may determine its own power consumption mode based on the information received about the determined power consumption policy, usage of the edge device, and information about neighboring edge devices in the set of edge devices. The edge device and/or network device may change power consumption modes of the edge device.

In some examples, the network device (e.g., network device 100) may apply the power consumption policy by providing information to a set or subset of client devices (e.g., client devices 103A, 103B, . . . , 103N) associated with an edge device in the network area zone to cause the client devices to enter a power consumption mode similar to the power consumption mode of the network area device. In some examples, the power consumption policy may indicate that all client devices, a subset of client devices, a set of client devices of certain types, a set of client devices associated with a set of edge devices, and/or other combinations of client devices to which the information should be provided.

In some examples, the network device (e.g., network device 100) may also provide information about the determined power consumption policy to an external power management system (e.g., external system 106). The external power management system may then cause a device connected to the external power management system to change power consumption based on the received information from the network device (e.g., network device 100). In some examples, the network device (e.g., network device 100) may sense and control power consumption of externally connected systems (e.g., systems 106) like the HVAC system, printers, televisions, lighting management, and/or other external systems that are connected to the network device. The network device (e.g., network device 100) may monitor the network area zone to determine whether occupancy of the network area zone has changed and a new power consumption policy should be applied. For example, the network device (e.g., network device 100) may monitor the network area zone continuously, at predetermined time intervals, at random intervals, based on the applied power consumption policy, based on the determined occupancy, and/or in another manner to determine whether occupancy of the network area zone has changed and the applied power consumption policy should change.

In some examples, the power consumption policy may comprise information that indicates that a subset of the edge devices should act as sensing edge devices to determine whether the occupancy of the network area zone should be changed. The network device (e.g., network device 100) may monitor the indicated subset of edge devices to determine whether occupancy of the network area zone changes.

In some examples, the power consumption policy may comprise information that indicates that a power consumption mode should change for the network area zone, a set of edge devices in the network area zone, subset(s) of edge devices in the network area zone, or other components associated with the network area zone. The change in power consumption mode may occur responding to an event occurring, at a predetermined time, responsive to a change in occupancy of the network area zone, and/or based on other factors. In some examples, the change in power consumption mode may be applied in a rolling basis (e.g., to adjacent edge devices in a sequential manner, to edge devices with predetermined characteristics, and/or in other patterns or manners). The network device (e.g., network device 100) may change the power consumption mode of the network area zone based on the information.

According to various implementations, a system that facilitates managing power consumption of a network and the various components described herein may be implemented in hardware and/or a combination of hardware and programming that configures hardware. Furthermore, in FIG. 1 and other Figures described herein, different numbers of components or entities than depicted may be used. In some examples, a system that facilitates managing power consumption of a network may comprise a set of edge devices, with at least one edge device being connected to a device.

Figure 2:
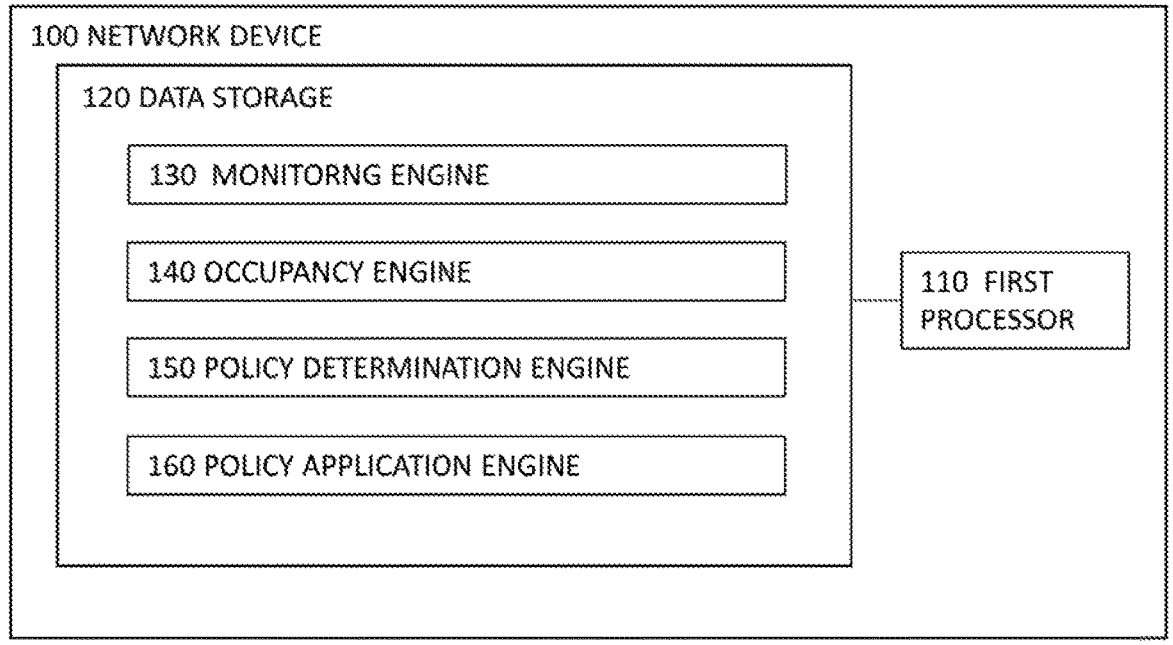
FIG. 2 is a block diagram depicting an example network device for managing power consumption of a network.

FIG. 2 is a block diagram depicting an example network device for facilitating managing power consumption of a network. In some examples, the example network device 100 may comprise the network device 100 of FIG. 1. Network device, which facilitates managing power consumption of a network, may comprise a physical processor 110, a monitoring engine 130, an occupancy engine 140, a policy determination engine 150, policy application engine 160, and/or other engines. The term "engine", as used herein, refers to a combination of hardware and programming that performs a designated function. As is illustrated with respect to FIG. 2, the hardware of each engine, for example, may include one or both of a physical processor and a machine-readable storage medium, while the programming is instructions or code stored on the machine-readable storage medium and executable by the physical processor to perform the designated function.

Monitoring engine 130 may monitor a set of network area zones (e.g., zones 101A, 101B, . . . , 101N) of a network coverage area, where each network area zone (e.g., zone 101A) may be associated with a set of edge devices (e.g., devices 102A, 102B, . . . , 102N). The monitoring engine 130 may monitor the set of network area zones in a manner similar or the same as described above with respect to FIG. 1.

The occupancy engine 140 may determine, for each network area zone (e.g., zone 101A), a first occupancy state of the network area zone based on the usage of the set of edge devices (e.g., 102A, 102B, . . . , 101 N) associated with the network area zone. In some examples, the occupancy engine 140 may determine the first occupancy state based on a number of client devices attached to the first set of edge device and an amount of usage of the first set of edge devices. In some examples, the occupancy engine 140 may determine an occupancy state of a network area zone in a manner similar or the same as described above with respect to FIG. 1.

Policy determination engine 150 may determine a first power consumption policy for the network area zone (e.g., zone 101A) based on the occupancy state determined by the occupancy engine 140. In some examples, the policy determination engine 150 may change, for the first network area zone, the first power consumption policy to a second power consumption policy based on a change in occupancy state in the first network area zone or in a neighboring network area zone. In some examples, the policy determination engine 150 may determine or change the first power consumption policy for the network area zone in a manner similar or the same as described above with respect to FIG. 1.

Policy application engine 160 may apply the first power consumption policy determined by the policy determination engine 150. The policy application engine 160 may apply the first power consumption policy in various manners, as described above.

In some examples, the policy application engine 160 may apply the first power consumption policy by determining, for each edge device in the first set of edge devices, a corresponding power consumption mode, and causing each edge device in the first set of edge devices to enter a corresponding determined power consumption mode. The policy application engine 160 may determine, for each edge device, the corresponding power consumption mode based on a set of functionalities of the edge device, based on a proximity of the edge device to an ingress/egress of the network area zone, and/or in other manners. The policy application engine 160 may cause each edge device to enter the corresponding determined power consumption mode by, for example, reducing the set of functionalities available via the edge device, causing the edge device to enter a low power state, and/or otherwise causing the edge device to enter the corresponding determined power consumption mode.

In other examples, the policy application engine 160 may apply by first power consumption policy by providing, to each edge device in the first set of edge devices, information about the determined first power consumption policy, determining, by the first edge device, a first power consumption mode based on the determined first power consumption policy, usage of the first edge device, and information about neighboring edge devices in the first set of edge devices, and changing, by the first edge device, the power consumption mode of the first edge device to the first power consumption mode.

In some examples, the policy application engine 160 may also provide information about the determined first power consumption policy to an external power management system, and cause a device connected to the external power management system to change power consumption.

The policy application engine 160 may apply a power consumption policy to a network area zone in a manner similar to or the same as described above with respect to FIG. 1.

In performing their respective functions, engines 130-160 may access storage medium 120 and/or other suitable database(s). Storage medium 120 may represent any memory accessible to the network device 100 that can be used to store and retrieve data. Storage medium 120 and/or other databases communicably coupled to the edge device may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. The network device 100 that facilitates managing power consumption of a network may access storage medium 120 locally or remotely via a network.

Storage medium 120 may include a database to organize and store data. The database may reside in a single or multiple physical device(s) and in a single or multiple physical location(s). The database may store a plurality of types of data and/or files and associated data or file description, administrative information, or any other data.

Figure 3:
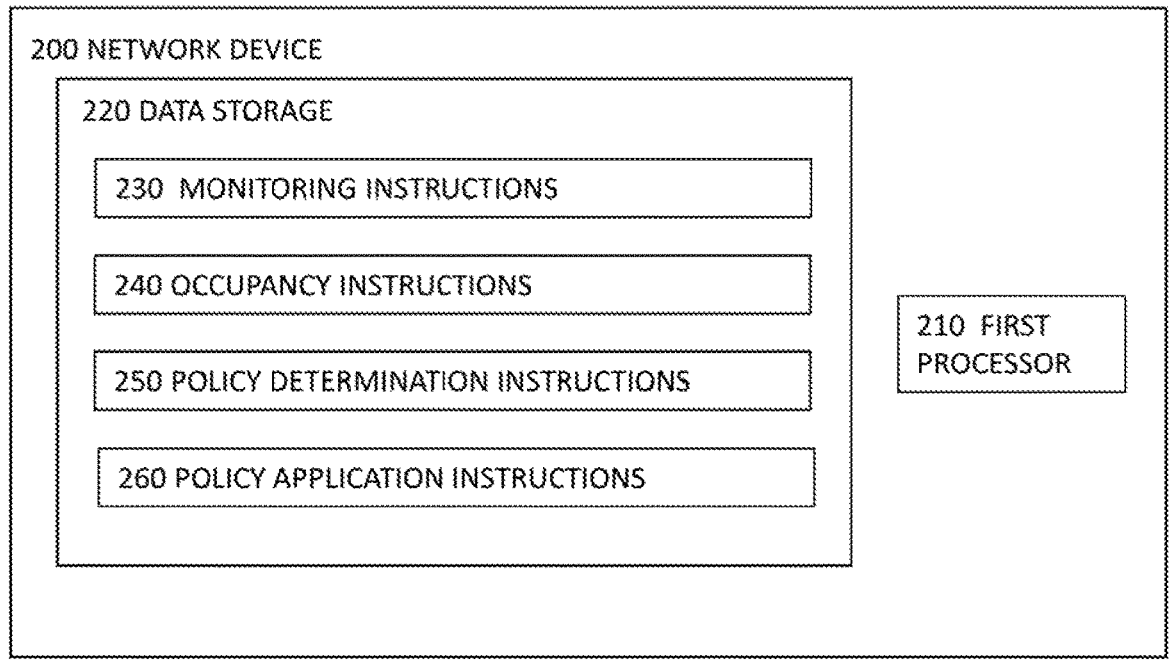
FIG. 3 is a block diagram depicting an example network device for managing power consumption of a network.
Figure 4:
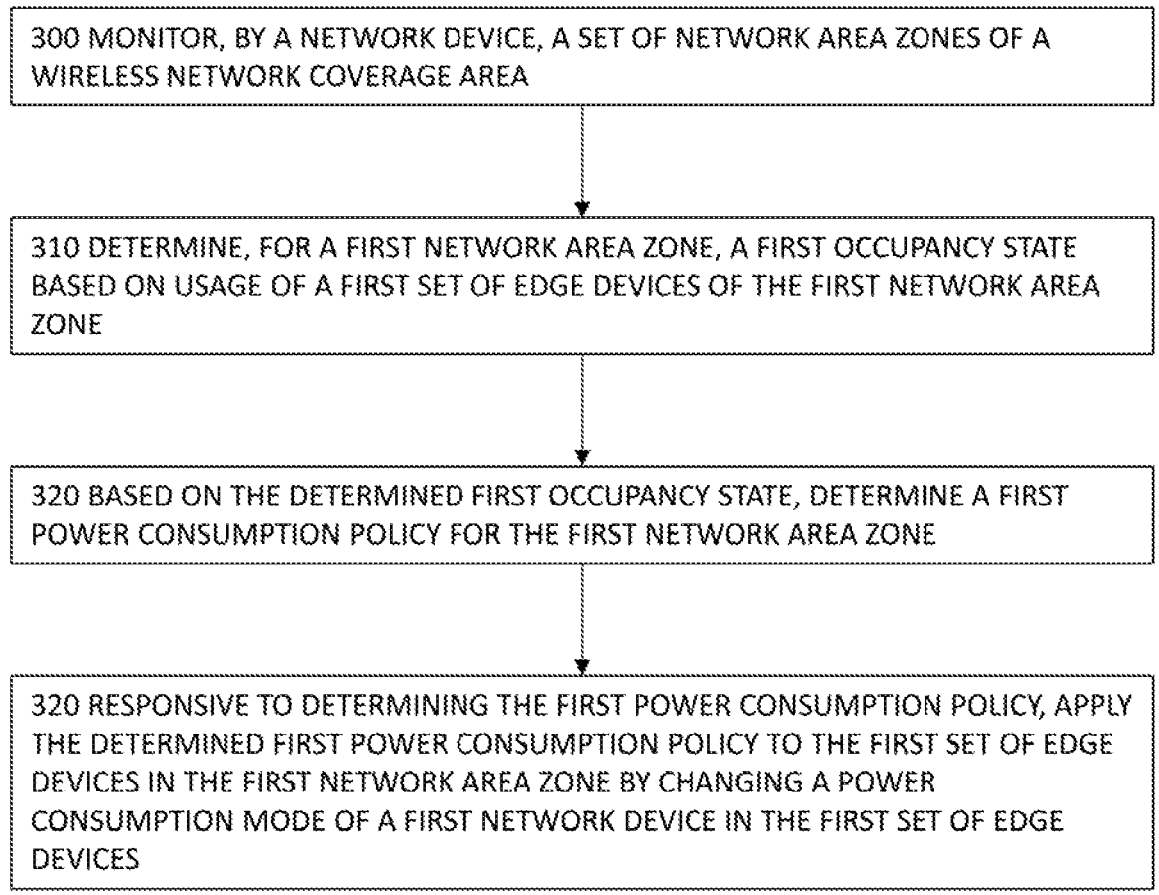
FIG. 4 is a flow diagram depicting an example method for managing power consumption of a network.

FIG. 3 is a block diagram depicting an example machine-readable storage medium 220 comprising instructions executable by a processor for managing power consumption of a network.

In the foregoing discussion, engines 130-160 were described as combinations of hardware and programming. Engines 130-160 may be implemented in a number of fashions. Referring to FIG. 3, the programming may be processor executable instructions 230-352 stored on a machine-readable storage medium 220 and the hardware may include a physical processor 210 for executing those instructions. Thus, machine-readable storage medium 220 can be said to store program instructions or code that when executed by physical processor 210 implements a network device that facilitates managing power consumption of a network of FIG. 1.

In FIG. 3, the executable program instructions in machine-readable storage medium 220 are depicted as monitoring instructions 230, occupancy instructions 240, policy determination instructions 250, policy application instructions 260, and/or other instructions. Instructions 230-260 represent program instructions that, when executed, cause processor 210 to implement engines 130-160, respectively.

Machine-readable storage medium 220 may be any electronic, magnetic, optical, or other physical storage device that contains or stores executable instructions. In some implementations, machine-readable storage medium 220 may be a non-transitory storage medium, where the term "non-transitory" does not encompass transitory propagating signals. Machine-readable storage medium 220 may be implemented in a single device or distributed across devices. Likewise, processor 210 may represent any number of physical processors capable of executing instructions stored by machine-readable storage medium 220. Processor 210 may be integrated in a single device or distributed across devices. Further, machine-readable storage medium 220 may be fully or partially integrated in the same device as processor 210, or it may be separate but accessible to that device and processor 210.

In one example, the program instructions may be part of an installation package that when installed can be executed by processor 210 to implement a network device that facilitates managing power consumption of a network. In this case, machine-readable storage medium 220 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 220 may include a hard disk, optical disk, tapes, solid state drives, RAM, ROM, EEPROM, or the like.

Processor 210 may be at least one central processing unit (CPU), microprocessor, and/or other hardware device suitable for retrieval and execution of instructions stored in machine-readable storage medium 220. Processor 210 may fetch, decode, and execute program instructions 230-260, and/or other instructions. As an alternative or in addition to retrieving and executing instructions, processor 210 may include at least one electronic circuit comprising a number of electronic components for performing the functionality of at least one of instructions 230-260, and/or other instructions.

FIG. 4 is a flow diagram depicting an example method for managing power consumption of a network. The various processing blocks and/or data flows depicted in FIG. 4 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 4 as illustrated (and described in greater detail below) is meant be an example and, as such, should not be viewed as limiting. The method of FIG. 4 may be implemented in the form of executable instructions stored on a machine-readable storage medium, such as storage medium 220, and/or in the form of electronic circuitry.

In an operation 300, a set of network area zones of a network coverage area may be monitored. For example, the network device 100 (and/or the monitoring engine 130, the monitoring instructions 230, or other resource of the network device 100) may monitor the set of network area zones. The network device 100 may monitor the set of network area zones in a manner similar or the same as that described above in relation to the execution of the monitoring engine 130, the monitoring instructions 230, and/or other resource of the network device 100.

In an operation 310, a first occupancy state may be determined for a first network area zone of the set of network area zones based on usage of a first set of edge devices of the first network area zone. For example, the network device 100 (and/or the occupancy engine 140, the occupancy instructions 240 or other resource of the network device 100) may determine the first occupancy state for the first network area zone. The network device 100 may determine the first occupancy state for the first network area in a manner similar or the same as that described above in relation to the execution of the occupancy engine 140, the occupancy instructions 240, and/or other resource of the network device 100.

In an operation 320, a first power consumption policy for the first network area zone may be determined based on the determined first occupancy state. For example, the network device 100 (and/or the policy determination engine 150, the policy determination instructions 250 or other resource of the network device 100) may determine the first power consumption policy for the first network area zone. The network device 100 may determine the first power consumption policy for the first network area zone in a manner similar or the same as that described above in relation to the execution of the policy determination engine 150, the policy determination instructions 250, and/or other resource of the network device 100.

In an operation 330, a first power consumption policy may be applied to the first set of edge devices in the first network area zone by at least changing a power consumption mode of a first network device in the first set of edge devices, responsive to determining the first power consumption policy. For example, the network device 100 (and/or the policy application engine 160, the policy application instructions 260, or other resource of the network device 100) may apply the first power consumption policy for the first network area zone. The network device 100 may apply the first power consumption policy for the first network area zone in a manner similar or the same as that described above in relation to the execution of the policy application engine 160, the policy application instructions 260, and/or other resource of the network device 100.

The foregoing disclosure describes a number of example implementations for managing power consumption of a network. The disclosed examples may include systems, devices, computer-readable storage media, and methods for managing power consumption of a network. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for managing power consumption of a network, the method comprising:
   monitoring, by a network device, a set of network area zones of a network coverage area, each network area zone associated with a set of edge devices;
   determining, for a first network area zone of the set of network area zones, a first occupancy state based on usage of a first set of edge devices of the first network area zone;
   based on the determined first occupancy state, determining a first power consumption policy for the first network area zone; and
   responsive to determining the first power consumption policy, applying the determined first power consumption policy to the first set of edge devices in the first network area zone at least by changing a power consumption mode of a first edge device in the first set of edge devices
   wherein applying the first power consumption policy further comprises:
      determining, for each edge device in the first set of edge devices, a corresponding power consumption mode; and
      causing each edge device in the first set of edge devices to enter the corresponding determined power consumption mode wherein the determining of the corresponding power consumption mode is based on a proximity of the edge device to an ingress/egress of the network area zone.

2. The method of claim 1, wherein determining the first occupancy state comprises:
   determining the first occupancy state based on a number of client devices attached to the first set of edge devices and an amount of usage of the first set of edge devices.

3. The method of claim 2, further comprising:
   changing the first power consumption policy to a second power consumption policy.

4. The method of claim 3, wherein the change from the first power consumption policy to the second power consumption policy is based on a change in the occupancy state in the first network area zone.

5. The method of claim 4, wherein change from the first power consumption policy to the second power consumption policy is based on a change in the occupancy state of a network area zone neighboring the first network area zone.

6. The method of claim 1, wherein causing each edge device to enter the corresponding determined power consumption mode comprises:
   reducing the set of functionalities available via the edge device or causing the edge device to enter a low power state.

7. The method of claim 1, wherein applying the first power consumption policy comprises:
   determining, by the first edge device, a first power consumption mode based on the determined first power consumption policy, usage of the first edge device, and information about neighboring edge devices in the first set of edge devices; and
   changing, by the first edge device, the power consumption mode of the first edge device to the first power consumption mode.

8. The method of claim 1, wherein applying the first power consumption policy comprises:
   providing information about the determined first power consumption policy to an external power management system; and
   causing a device connected to the external power management system to change power consumption.

9. The method of claim 1, further comprising:
   changing, for the first network area zone, the first power consumption policy to a second power consumption policy based on a change in occupancy state in the first network area zone or in a neighboring network area zone.

10. A non-transitory machine-readable storage medium comprising instructions executable by a physical processor of a computing device for managing power consumption of a network, the machine-readable storage medium comprising:
  instructions to monitor a set of network area zones of a network coverage area, each network area zone associated with a set of edge devices;
  instructions to determine, for a first network area zone of the set of network area zones, a first occupancy state based on usage of a first set of edge devices of the first network area zone;
  instructions to determine a first power consumption policy for the first network area zone based on the determined first occupancy state;
  instructions to apply, responsive to determining the first power consumption policy, the determined first power consumption policy to the first set of edge devices in the first network area zone by
  determining a power consumption mode for each of the first set of edge devices based on the applied first power consumption policy wherein the first set of edge devices comprises at least two edge devices; and
  instructing each of the first set of edge devices to enter a respective determined power consumption mode, wherein the power consumption mode is determined based on a proximity of an edge device to an ingress/egress of the network area zone.

11. The non-transitory machine-readable storage medium of claim 10, wherein the instructions to determine the first occupancy state comprise:
  instructions to determine the first occupancy state based on a number of client devices attached to the first set of edge devices and an amount of usage of the first set of edge devices.

12. The non-transitory machine-readable storage medium of claim 10, wherein the instructions further comprise:
  instructions to provide information about the determined first power consumption policy to an external power management system; and
  instructions to cause a device connected to the external power management system to change power consumption.

13. The non-transitory machine-readable storage medium of claim 10, further comprising:
  instructions to change, for the first network area zone, the first power consumption policy to a second power consumption policy based on a change in occupancy state in the first network area zone or in a neighboring network area zone.

14. A system for managing power consumption of a network, the system comprising:
  a physical processor that implements machine readable instructions that cause the system to:
  monitor a set of network area zones of a network coverage area, each network area zone associated with a set of edge devices;
  determine, for a first network area zone of the set of network area zones, a first occupancy state based on usage of a first set of edge devices of the first network area zone;
  based on the determined first occupancy state, determine a first power consumption policy for the first network area zone;
  responsive to determining the first power consumption policy, apply the determined first power consumption policy to the first set of edge devices in the first network area zone by changing a power consumption mode of a first edge device in the first set of edge devices;
  provide, to each edge device in the first set of edge devices, information about the determined first power consumption policy wherein the first set of edge devices comprises at least two edge devices and applying the first power consumption policy further comprises;
  determine, by the first edge device, a first power consumption mode based on the determined first power consumption policy, usage of the first edge device and information about neighboring edge devices in the first set of edge devices;
  change, by the first edge device, the power consumption mode of the first edge device to the first power consumption mode;
  cause a change of a client device power consumption mode of the client device based on the determined first power consumption policy;
  apply the first consumption policy by
    determining, for each edge device in the first set of edge devices, a corresponding power consumption mode based on a proximity of the edge device to an ingress/egress of the network area zone; and
    causing each edge device in the first set of edge devices to enter a corresponding determined power consumption mode.

15. The system of claim 14, wherein the physical processor implements machine readable instructions to cause the system to cause each edge device to enter the corresponding determined power consumption mode by:
  reducing the set of functionalities available via the edge device or causing the edge device to enter a low power state.

16. The system of claim 14, wherein the physical processor implements machine readable instructions to cause the system to:
  provide information about the determined first power consumption policy to an external power management system; and
  cause a device connected to the external power management system to change power consumption.

17. The system of claim 14, wherein the physical processor implements machine readable instructions to cause the system to:
  change, for the first network area zone, the first power consumption policy to a second power consumption policy based on a change in occupancy state in the first network area zone or in a neighboring network area zone.

* * * * *

UNITED STATES PATENT AND TRADEMARK OFFICE
CERTIFICATE OF CORRECTION

PATENT NO. : 10,827,433 B2
APPLICATION NO. : 15/720293
DATED : November 3, 2020
INVENTOR(S) : Charles Lukaszewski et al.

Page 1 of 1

It is certified that error appears in the above-identified patent and that said Letters Patent is hereby corrected as shown below:

On the Title Page

Item (72), Inventors, should read:
Charles LUKASZEWSKI, Santa Clara, CA (US)
Sachin GANU, San Jose, CA (US)
Shahnawaz SIRAJ, San Jose, CA (US)
Eldad PERAHIA, Portland, OR (US)
Andre BEAUDIN, Montreal, (CA)
Qiang ZHOU, Beijing, (CN)
Ahmad KHOLAIF, Santa Clara, CA (US)
Yu LIU, Santa Clara, CA (US)

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*